US006917501B2

(12) United States Patent
Byrne et al.

(10) Patent No.: US 6,917,501 B2
(45) Date of Patent: Jul. 12, 2005

(54) ELECTROSTATIC DISCHARGE PROTECTION APPARATUS AND METHOD EMPLOYING A HIGH FREQUENCY NONCOUPLED STARTER CIRCUIT

(75) Inventors: Daniel J. Byrne, Fort Collins, CO (US); Arnol S. Pandit, Greeley, CO (US); Mark N. Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 319 days.

(21) Appl. No.: 10/374,607

(22) Filed: Feb. 26, 2003

(65) Prior Publication Data

US 2004/0165326 A1 Aug. 26, 2004

(51) Int. Cl.[7] .................................................. H02H 9/00
(52) U.S. Cl. ......................................................... 361/56
(58) Field of Search ........................................... 361/56

(56) References Cited

U.S. PATENT DOCUMENTS 3,566,197 A * 2/1971 Nilsson et al. .............. 361/128
3,973,224 A * 8/1976 Gaule et al. .................. 333/12
5,099,762 A * 3/1992 Drapala ................... 102/202.1
6,156,999 A * 12/2000 Ignatchenko et al. .... 219/130.4
6,191,536 B1 * 2/2001 Dolmovich .......... 315/209 CD
6,272,965 B1 * 8/2001 Baginski et al. .............. 86/1.1
6,448,714 B1 * 9/2002 Akutsu .................. 315/111.01

* cited by examiner

*Primary Examiner*—Brian Sircus
*Assistant Examiner*—James Demakis

(57) ABSTRACT

An apparatus and method for providing electrostatic discharge protection. An exemplary micro tube spark gap type electrostatic discharge protection device comprises first and second separated spark electrodes hat form a spark gap therebetween. A high frequency noncoupled starter circuit is provided that comprises first and second high voltage electrodes disposed adjacent to the spark gap, and coupled to a high frequency voltage source. The high frequency voltage source generates a high frequency voltage that passes from the high voltage electrodes through the spark gap. The high frequency voltage (electric field) supplied by the voltage source falls just short of ionizing the gap, but provides energy to start a discharge. Once ionization occurs, the high frequency voltage is shut off, allowing for maximal energy loss. This results in a voltage versus time characteristic having a decreased ionization voltage and an increased power loss level after the high frequency voltage shuts off.

3 Claims, 2 Drawing Sheets

ELECTROSTATIC DISCHARGE PROTECTION APPARATUS AND METHOD EMPLOYING A HIGH FREQUENCY NONCOUPLED STARTER CIRCUIT

TECHNICAL FIELD

The present invention relates generally to electrostatic discharge protection devices and methods, and more specifically, to a micro tube spark gap type electrostatic discharge protection device and an electrostatic discharge protection method employing a high frequency noncoupled starter circuit.

BACKGROUND

Heretofore, the assignee of the present invention has developed spark gap devices that function as electrostatic discharge protection devices. These electrostatic protection devices have a voltage versus time characteristic during discharge that is similar to the curve shown in FIG. 1. Referring to FIG. 1, the voltage across the electrostatic protection device rises until the occurrence of a discharge event. Ionization in the gap then increases until saturation occurs. The voltage level remains generally constant until the end of the discharge event.

It is desirable to decrease the voltage required for discharge while maintaining the power loss level (or voltage level after saturation), which is the voltage difference between the generally horizontal portion of the curve and zero voltage shown in FIG. 1. However, merely decreasing the gap distance decreases the discharge voltage, and also decreases the energy dissipated during the discharge event, which is generally undesirable. It is also desirable to convert the current pulse to light and heat quickly.

It is an objective of the present invention to provide for a micro tube spark gap type electrostatic discharge protection device having a high frequency noncoupled starter circuit. It is another objective of the present invention to provide for an improved electrostatic discharge protection method.

SUMMARY OF THE INVENTION

To accomplish the above and other objectives, the present invention provides for an improved micro tube spark gap type electrostatic discharge protection device that comprises a high frequency noncoupled starter circuit, and an improved electrostatic discharge protection method. The micro tube spark gap type electrostatic discharge protection device comprises first and second spark electrodes that are separated by a spark gap. The high frequency noncoupled starter circuit comprises first and second high voltage electrodes disposed laterally adjacent to the spark gap. The first and second high voltage electrodes are coupled to a high frequency voltage source. The high frequency voltage source generates a high frequency electric field that passes through the spark gap.

The high frequency electric field falls just short of ionizing the gap, but provides additional energy to start the discharge. Once ionization occurs, the high frequency voltage shuts itself off, allowing for maximal energy loss. This results in a voltage versus time characteristic having a decreased ionization voltage and an increased power loss level after the high frequency voltage shuts off.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1:
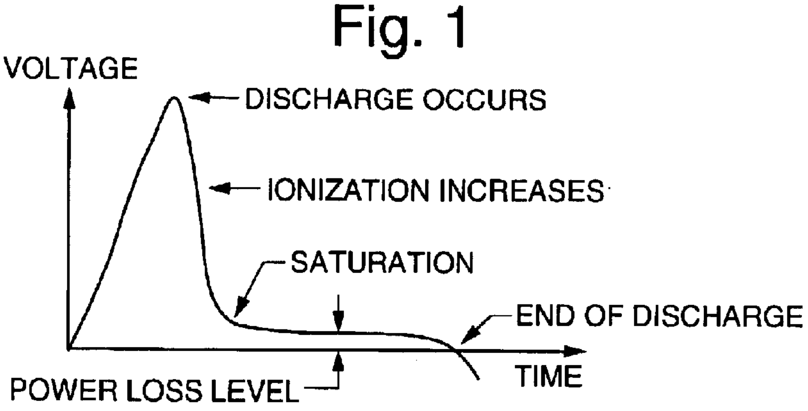
FIG. 1 is a graph that illustrates a voltage versus time characteristic of a conventional micro tube spark gap type electrostatic discharge protection device.
Figure 2:
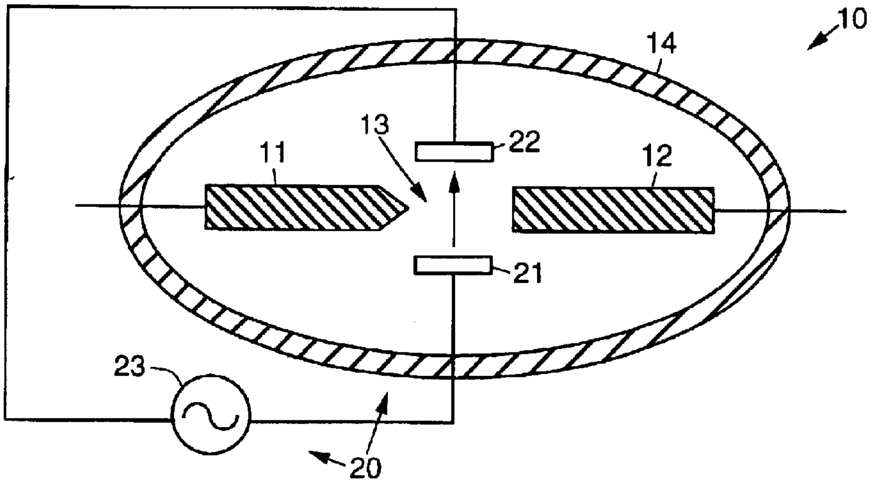
FIG. 2 illustrates an exemplary micro tube spark gap type electrostatic discharge protection device in accordance with the principles of the present invention.

Referring again to the drawing figures, FIG. 2 illustrates an exemplary embodiment of a micro tube spark gap type electrostatic discharge protection device 10 in accordance with the principles of the present invention. The electrostatic discharge protection device 10 comprises a high frequency noncoupled starter circuit 20 in accordance with the principles of the present invention.

The exemplary micro tube spark gap type electrostatic discharge protection device 10 comprises first and second spark electrodes 11, 12 that are separated by a spark gap 13. The spark electrodes 11, 12 and spark gap 13 are surrounded by a protective housing 14.

The high frequency noncoupled starter circuit 20 comprises first and second high voltage electrodes 21, 22 disposed laterally adjacent to the spark gap 13. The first and second high voltage electrodes 21, 22 are coupled to a high frequency voltage source 23. The high frequency voltage source generates 23 a high frequency electric field that passes through the spark gap 13.

The high frequency voltage supplied by the high frequency voltage source 23 is at a frequency and voltage level that falls just short of ionizing the spark gap 13. However, the high frequency voltage provides additional energy to start a discharge. Subsequent to the occurrence of a discharge event, ionization occurs, and the high frequency voltage supplied by the high frequency voltage source 23 is shut off, allowing for maximal energy loss after ionization.

Figure 3:
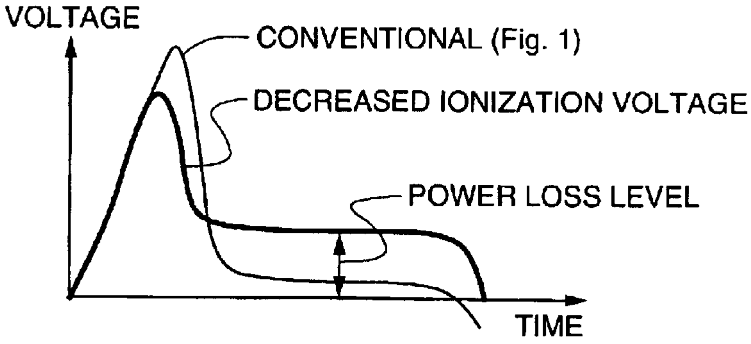
FIG. 3 is a graph that illustrates a voltage versus time characteristic of an exemplary electrostatic discharge protection device in accordance with the principles of the present invention.

This results in a voltage versus time characteristic having a decreased ionization voltage and an increased power loss level after the high frequency voltage shuts off. FIG. 3 is a graph that illustrates a voltage versus time characteristic of n exemplary electrostatic discharge protection device in accordance with the principles of the present invention.

Figure 4:
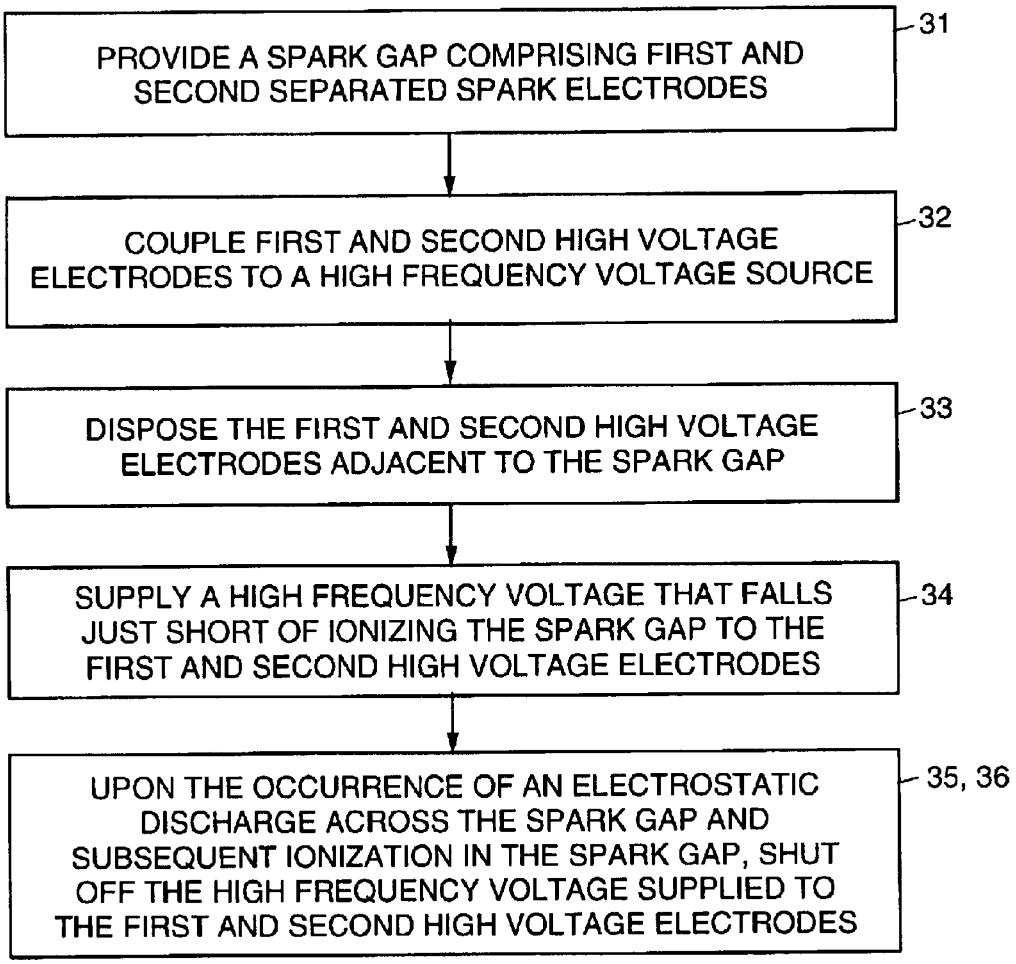
FIG. 4 illustrates an exemplary electrostatic discharge protection method in accordance with the principles of the present invention.

Referring to FIG. 4, it illustrates an exemplary electrostatic discharge protection method 30 in accordance with the principles of the present invention. The exemplary electrostatic discharge protection method 30 comprises the following steps.

A spark gap 13 comprising first and second separated spark electrodes 11, 12 is provided 31. First and second high voltage electrodes 21, 22 are coupled 32 to a high frequency voltage source 23. The first and second high voltage electrodes 21, 22 are disposed 33 adjacent to the spark gap 13. A high frequency electric field that falls just short of ionizing the spark gap 13 is supplied 34 to the first and second high voltage electrodes 21, 22. An electrostatic discharge occurs

35 across the spark gap 13, causing ionization of the medium (air) in the spark gap 13. Once ionization occurs, the high frequency voltage supplied to the first and second high voltage electrodes 21, 22 is shut off 36, resulting in maximal energy loss after ionization.

Thus, improved apparatus and methods that provide electrostatic discharge protection have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus comprising:

a micro tube spark gap type electrostatic discharge protection device comprising a spark gap; and a high frequency noncoupled starter circuit comprising:

first and second high voltage electrodes disposed laterally adjacent to the spark gap;

a high frequency voltage source coupled to the first and second high voltage electrodes that generates a high frequency voltage across the spark gap having a frequency and voltage level that falls just short of ionizing the spark gap, and shuts off the high frequency voltage when ionization occurs.

2. The apparatus recited in claim 1 wherein the micro tube spark gap type electrostatic discharge protection device comprises:

first and second spark electrodes that are separated by a spark gap; and a protective housing surrounding the spark electrodes and spark gap.

3. An electrostatic discharge protection method, comprising the steps of:

providing a spark gap comprising first and second separated spark electrodes;

coupling first and second high voltage electrodes to a high frequency voltage source;

disposing the first and second high voltage electrodes adjacent to the spark gap;

supplying a high frequency voltage that falls just short of ionizing the spark gap to the first and second high voltage electrodes; and upon the occurrence of an electrostatic discharge across the spark gap and subsequent ionization in the spark gap, shutting off the high frequency voltage supplied to the first and second high voltage electrodes.

* * * * *

UNITED STATES PATENT AND TRADEMARK OFFICE

CERTIFICATE OF CORRECTION

PATENT NO. : 6,917,501 B2 
APPLICATION NO. : 10/374607
DATED : July 12, 2005
INVENTOR(S) : Daniel J. Byrne et al.

It is certified that error appears in the above-identified patent and that said Letters Patent is hereby corrected as shown below:

Title Page, Item (75), delete inventor “Arnol S. Pandit” and insert therefor --Amol S. Pandit--

Column 2, line 53, before “exemplary” delete “n” and insert therefor --an--

Signed and Sealed this

Twenty-seventh Day of May, 2008

JON W. DUDAS
*Director of the United States Patent and Trademark Office*